(12) United States Patent
Gerig

(10) Patent No.: US 6,459,378 B2
(45) Date of Patent: *Oct. 1, 2002

(54) ANIMAL SHOCK COLLAR WITH LOW IMPEDANCE TRANSFORMER

(75) Inventor: Duane A. Gerig, Fort Wayne, IN (US)

(73) Assignee: Innotek, Inc., Garrett, IN (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/776,146

(22) Filed: Feb. 2, 2001

Related U.S. Application Data

(63) Continuation-in-part of application No. 09/241,360, filed on Jan. 29, 1999, now Pat. No. 6,184,790.

(51) Int. Cl.⁷ .............................................. G08B 23/00
(52) U.S. Cl. .................................... 340/573.3; 119/721
(58) Field of Search ....................... 340/573.3; 119/721, 119/859, 908

(56) References Cited

U.S. PATENT DOCUMENTS

| | | | |
|---|---|---|---|
| 3,589,337 A | 6/1971 | Doss | ............................ 119/29 |
| 5,666,908 A | 9/1997 | So | .............................. 119/720 |
| 6,184,790 B1 * | 2/2001 | Gerig | ....................... 340/573.3 |

* cited by examiner

Primary Examiner—Thomas Mullen
(74) Attorney, Agent, or Firm—Taylor & Aust, P.C.

(57) ABSTRACT

A remote receiver unit is for use in an animal behavior modification system that applies an electrical shock to an animal. The remote receiver unit has an electrical shock device including two electrodes configured for contacting the animal, a source of alternating current voltage, and an electrical transformer with a primary coil and a secondary coil. The primary coil is electrically connected to the source of alternating current voltage. The secondary coil is electrically connected to at least one of the two electrodes. The transformer has an output impedance of less than 900 ohms. A receiver circuit is electrically connected to the shock device. The receiver circuit is configured for activating the shock device in response to a received signal.

14 Claims, 2 Drawing Sheets

ANIMAL SHOCK COLLAR WITH LOW IMPEDANCE TRANSFORMER

CROSS REFERENCE TO RELATED APPLICATIONS

This is a continuation-in-part of U.S. patent application Ser. No. 09/241,360, entitled "ANIMAL SHOCK COLLAR WITH LOW IMPEDANCE TRANSFORMER", filed Jan. 29, 1999 now U.S. Pat. No. 6,184,790.

BACKGROUND OF THE INVENTION

1. Field of the Invention

The present invention relates to animal behavior modification systems, and, more particularly, animal behavior modification systems which apply an electrical shock to an animal.

2. Description of the Related Art

Animals such as dogs may be fitted with a collar which carries a receiver unit and a pair of electrodes for applying electrical stimulation to the skin of the dog in order to control its behavior. For example, a conventional pet containment system includes a stationary transmitter which is connected to an endless wire placed around the confinement area under the surface of the ground. Over the endless wire, the stationary transmitter transmits a radio frequency (RF) signal which is received by the receiver unit if the dog approaches too close to the wire. In response to receiving the signal, a voltage is applied across the electrodes, which causes an electrical current to flow through the dog's skin between the two electrodes. Alternatively, the trainer may carry a portable transmitter which selectively transmits an RF signal to the receiver unit for electrical stimulation when the animal exhibits undesirable behavior. As another option, a stationary transmitter may transmit an RF signal which is received by the receiver so long as the dog is in the confinement area. If the dog strays from the confinement area, the RF signal is no longer received and electrical stimulation is applied to the dog through the electrodes.

It is known to provide a voltage across the electrodes by using a high voltage, high output impedance flyback transformer with open circuit voltages ranging between approximately 3000V and 10,000V at the maximum levels. The transformer is small enough to fit within the confined housing on a collar placed around an animal's neck. In order to generate the high voltage levels in a small package, the transformer has numerous turns of fine wire on the secondary coil and has an output impedance of greater than 1500 ohms.

A problem is that the electrodes can be at least partially shorted out or shunted by water between the electrodes. The water may be carried on the skin and/or fur of the dog, or the water may be completely surrounding the electrodes when the dog is submerged in water. This problem particularly occurs when the dog has been in the rain, or when the dog goes into a lake, such as while hunting. The water between the electrodes presents less electrical resistance (approximately 200–500 ohms) than does the dog's skin. Thus, most of the current flows through the water, and the low level of remaining current which flows through the dog's skin may not be enough to get the dog's attention.

A related problem is that since the transformer's output impedance of over 1500 ohms is so much greater than the resistance of the water (200–500 ohms), there is both a large voltage drop across the secondary coil and an impedance mismatch between the transformer and the load.

The large voltage drop across the secondary coil reduces the voltage that can be applied to the electrodes. The impedance mismatch limits the amount of power that can be transmitted from the transformer to the load. In dry loading conditions, in which the electrodes are pressed against the animal's skin, the electroshock voltage levels drop to the hundreds of volts range, which is adequate to effect the desired electroshock stimulus. However, in water or in wet conditions, the electroshock voltage levels drop to several tens of volts, which may be completely undetectable by the animal.

It is also known to surround the sides of the electrodes with an electrically insulating material which blocks the flow of current through the adjacent water. Only the tips of the electrodes which contact the skin of the animal are left exposed. A problem is that the uninsulated electrode tips must be firmly pressed against and into the animal's skin so that the skin effectively insulates the electrode tips from the surrounding wet fur. However, pressing the electrode tips tightly against the animal's skin can lead to lesions and infections at the electrode contact site. For this and other reasons, many dog owners are reluctant to tighten the collar around the dog's neck to the required degree.

Yet another problem is that internal arcing or corona discharges may occur within the receiver unit due to the transformer's high output voltage (up to 10,000V) when the system is unloaded. The close spacing between the electrical components or traces within the receiver unit, as required by the dimensional limitations of the receiver unit, increases the likelihood of such electrical arcing.

What is needed in the art is a dog training collar which provides an effective electroshock stimulus to either a dry or wet animal without insulating the sides of the electrodes or burying the electrodes in the animal's skin. Further, internal arcing due to the high voltages within the receiver unit must be avoided.

SUMMARY OF THE INVENTION

The present invention provides a dog training collar including a low impedance transformer which ensures that an adequate current is sourced through the animal's skin, even in wet conditions. The open circuit output voltage of the transformer is limited.

The invention comprises, in one form thereof, a remote receiver unit for use in an animal behavior modification system that applies an electrical shock to an animal. The remote receiver unit has an electrical shock device including two electrodes configured for contacting the animal, a source of alternating current voltage, and an electrical transformer with a primary coil and a secondary coil. The primary coil is electrically connected to the source of alternating current voltage. The secondary coil is electrically connected to at least one of the two electrodes. The transformer has an output impedance of less than 900 ohms. A receiver circuit is electrically connected to the shock device. The receiver circuit is configured for activating the shock device in response to a received signal.

An advantage of the present invention is that an effective electroshock stimulus can be applied to an animal in a wet environment without insulating the electrodes and without the need for tightening the collar to such a degree that the electrodes are effectively buried in the animal's skin.

Another advantage is that the open circuit output voltage of the transformer is limited to thereby avoid internal arcing within the receiver unit.

BRIEF DESCRIPTION OF THE DRAWINGS

The above-mentioned and other features and advantages of this invention, and the manner of attaining them, will become more apparent and the invention will be better understood by reference to the following description of embodiments of the invention taken in conjunction with the accompanying drawings, wherein.

Corresponding reference characters indicate corresponding parts throughout the several views. The exemplifications set out herein illustrate one preferred embodiment of the invention, in one form, and such exemplifications are not to be construed as limiting the scope of the invention in any manner.

DETAILED DESCRIPTION OF THE INVENTION

Figure 1:
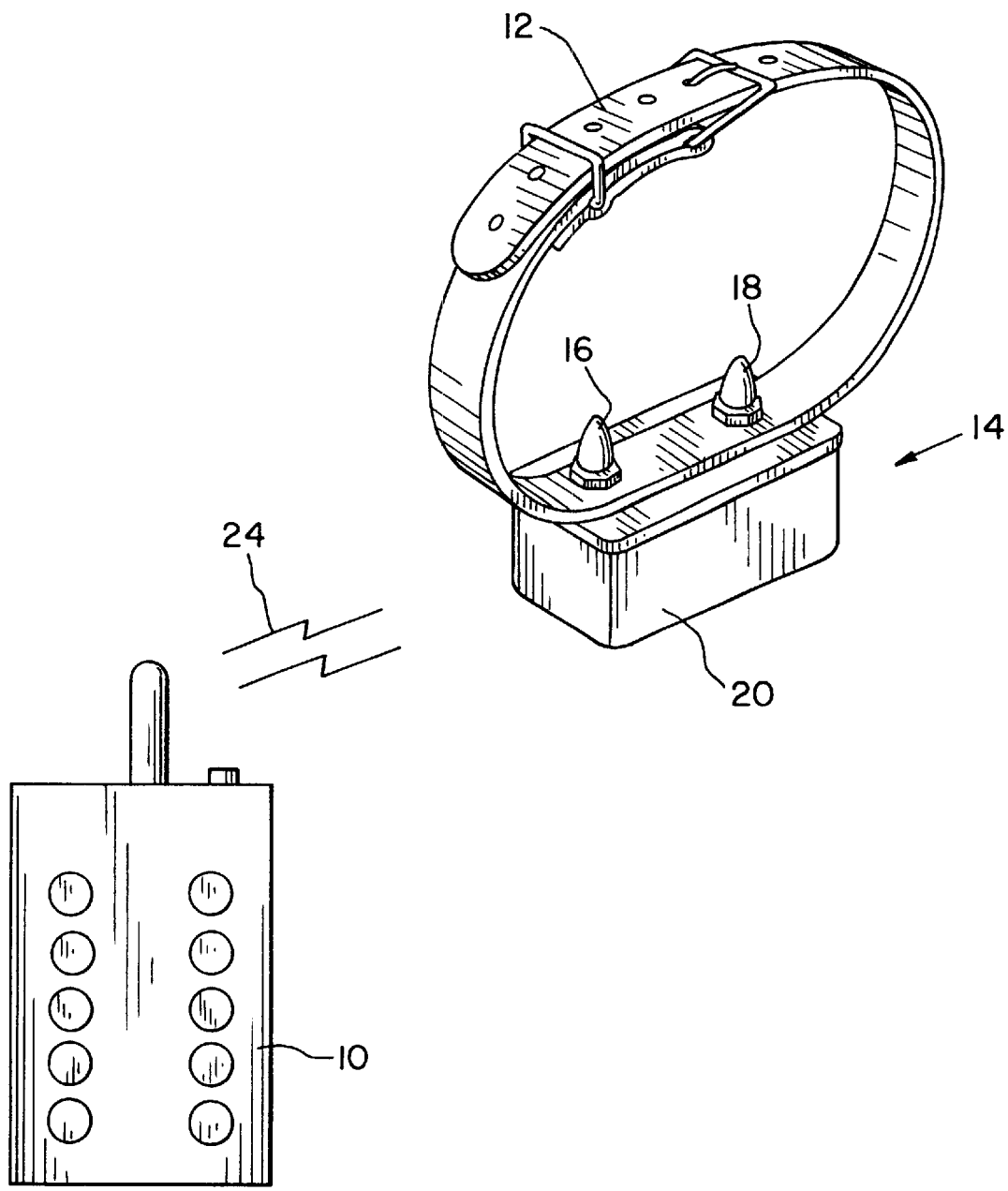
FIG. 1 is a perspective view of a transmitter and one embodiment of a receiver unit of the present invention.
Figure 2:
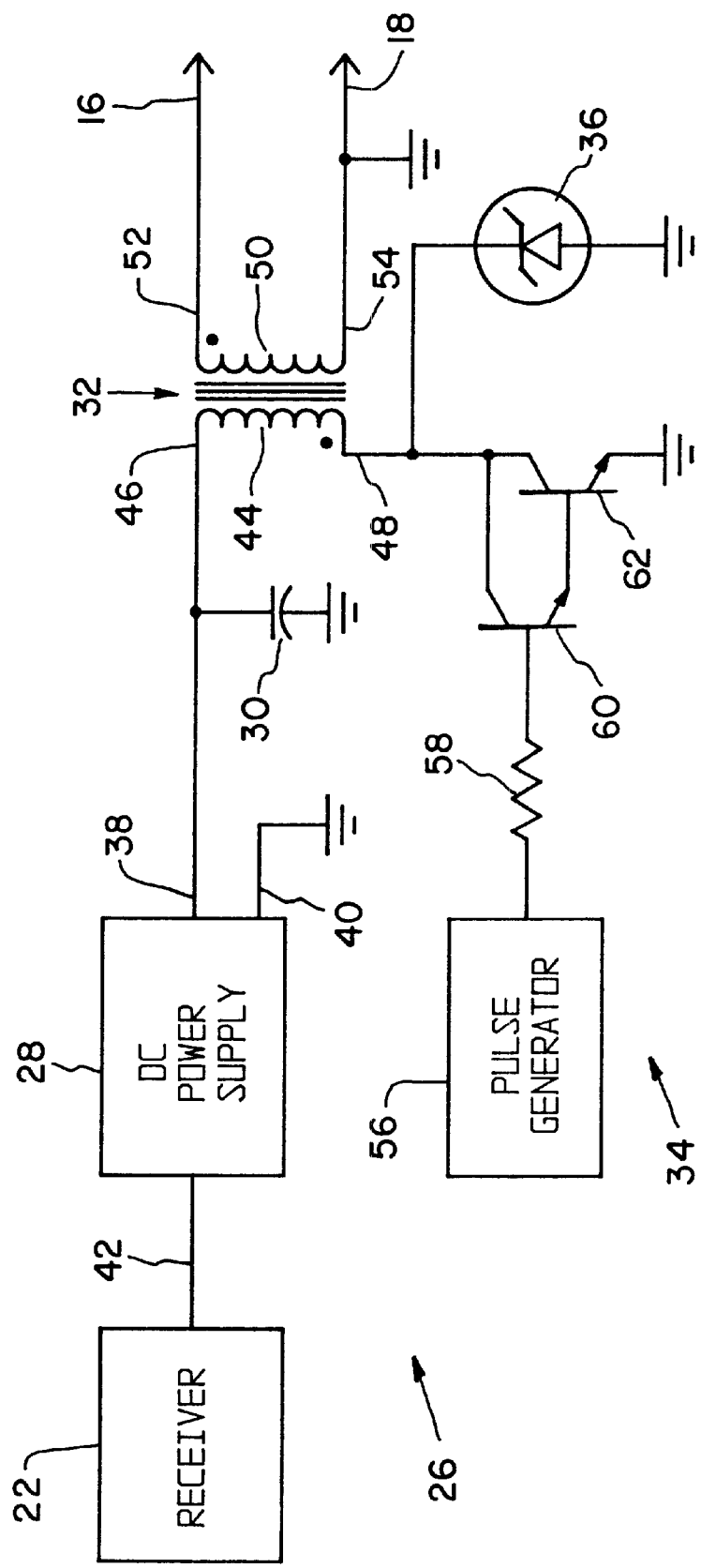
FIG. 2 is a schematic diagram of the receiver unit of FIG. 1.

Referring now to the drawings and particularly to FIG. 1, there is shown an animal behavior modification system including a transmitter 10 and an animal shock collar 12 carrying one embodiment of a remote receiver unit 14 of the present invention. Remote receiver unit 14 includes two probes or electrodes 16 and 18 projecting from a hermetically sealed box 20. Within box 20 is contained a receiver circuit 22 (FIG. 2) which receives a signal, indicated at 24, transmitted from transmitter 10. Remote receiver unit 14 also includes an electrical shock device 26 including a direct current (DC) power supply 28, a charging capacitor 30, a transformer 32, a switching device 34 and a transient voltage suppressor or voltage limiting device 36.

DC power supply 28 includes a battery having a positive terminal 38 connected to transformer 32 and a grounded terminal 40. DC power supply 28 can also have control circuitry (not shown) for receiving a control signal from receiver circuit 22 on line 42.

Transformer 32 includes a primary coil 44, having a first terminal 46 connected to positive terminal 38 of battery 28, and a second terminal 48 connected to switching device 34 and voltage limiter 36. Transformer 32 also includes a secondary coil 50, having a third terminal 52 connected to electrode 16, and a grounded fourth terminal 54 connected to electrode 18.

Under operating conditions, the output impedance of transformer 32 can be less than 1000 ohms, and is typically less than 200 ohms.

By using a transformer with substantially less output impedance than that of transformers known to be used in shock collars (over 1500 ohms) the voltage drop across the secondary coil under wet conditions is greatly reduced and, thus, more voltage can be applied to the electrodes under wet, loaded conditions. Further, since the output impedance of transformer 32 is closer to the resistance of the water surrounding electrodes 16 and 18 (200–500 ohms), the problems associated with the impedance mismatch between transformer 32 and the load are substantially reduced, thereby allowing more power to be transmitted through electrodes 16 and 18.

The turns ratio of transformer 32, i.e., the ratio of the number of turns in secondary coil 50 to the number of turns in primary coil 44, can range approximately between 30 and 50. The inductance of secondary coil 50 can range between approximately 0.05 H and 0.30 H, and more favorably between approximately 0.10 H and 0.22 H. The resistance of secondary coil 50 can range approximately between 50 ohms and 900 ohms, and more favorably between 100 ohms and 150 ohms. The thickness of the wire forming secondary coil 50 can range between approximately 35 AWG and 45 AWG. In one embodiment, secondary coil 50 has 1000 turns and primary coil 44 has 26 turns, producing a turns ratio of approximately 38:1. In this embodiment, the inductance of secondary coil 50 is approximately 0.155 H, its resistance is approximately 118 ohms, and its thickness is approximately 41 AWG. The inductance of primary coil 44 is approximately between 100 $\mu$H and 150 $\mu$H, its resistance is approximately between 0.10 ohms and 0.15 ohms, and its thickness is approximately between 20 AWG and 30 AWG.

Switching device 34, functioning as a transformer drive circuitry, includes a pulse generator 56, a current limiting resistor 58, and transistors 60 and 62. Pulse generator 56 produces a continuous series of pulses, each of which momentarily allows current to flow through transistors 60 and 62. Between the pulses, however, transistors 60 and 62 prevent current from flowing from second terminal 48 of primary coil 44 to electrical ground. The series of pulses produced by switching device 34 serves to continuously and cyclically connect and disconnect second terminal 48 with ground. This, in turn, causes the voltage of DC power supply 28 to be cyclically applied across and removed from terminals 46 and 48, thereby producing an alternating current voltage waveform. Thus, the combination of switching device 34 and DC power supply 28 forms a source of alternating current voltage that is applied across terminals 46 and 48 of primary coil 44. In one embodiment, pulse generator 56 cycles with a period of approximately between 6 and 8 milliseconds, with a pulse width of approximately 200 $\mu$s.

Charging capacitor 30 is charged by DC power supply 28 between the pulses produced by pulse generator 56. During a pulse, however, when current from DC power supply 28 flows through primary coil 44, capacitor 30 also discharges through primary coil 44. Thus, capacitor 30 serves to increase the current sourcing capacity of the source of alternating current voltage formed by battery 28 and switching device 34.

Transient voltage suppressor 36 interconnects second terminal 48 of primary coil 44 with ground when the voltage at second terminal 48 exceeds a predetermined level, such as, for example, 50V. That is, transient voltage suppressor 36 clamps or limits the voltage at second terminal 48 by draining current from second terminal 48 to ground until the voltage at second terminal 48 is again below the threshold voltage, at which transient voltage suppressor 36 prevents further current flow to ground. In this way, transient voltage suppressor 36 functions as a voltage limiting device.

During operation, transformer 32 acts as a flyback transformer having a first mode and a second mode, also known as a flyback mode. The first mode occurs while a pulse is being generated, which causes second terminal 48 to be connected to ground through transistors 60 and 62. In a standard flyback transformer circuit implementation, the output of the transformer is diode rectified, thereby preventing current from flowing in the secondary winding during the first mode. In the present invention, however, the output diode is eliminated, thereby allowing transformer 32 to supply an output across secondary coil 50 during the first mode of operation. Transformer 32 operates in a standard step up manner and the output voltage across secondary coil 50 is a function of the DC input voltage, the turns ratio of transformer 32, and the load applied to the output terminals 52 and 54.

The flyback mode occurs between pulses, during which time second terminal 48 is disconnected from ground. During the flyback mode, the energy stored in the transformer core or primary coil 44 is transferred to secondary coil 50. The output voltage across secondary coil 50 is a function of the energy stored in primary coil 44 and the turns ratio of transformer 32.

The low output impedance of transformer 32 coupled with the production of an output voltage in either of the two modes of operation enables an adequate electroshock stimulus to be applied to the dog in either a wet or dry environment. In a wet environment, the primary electroshock stimulus results from the first operational mode. The load impedance. applied to the transformer output in a wet environment is very low in comparison to the skin loading in a dry environment due to the loading effects of the water. Since the primary energy in the first operational mode is derived from the input power sources 28 and 30 rather than from energy stored in the transformer core, transformer 32 is capable of delivering substantially more output power in the first mode. The low output impedance of transformer 32 is required to effectively deliver this power to a load which includes the parallel combination of the water and the animal's skin.

During the first operational mode, and under a wet, loaded condition, the output voltage across secondary coil 50 remains relatively low (approximately 70V), but the current is relatively high (greater than 100 mA). The power delivered is high enough that, with electrodes 16 and 18 under water, the shock can be felt by the skin without direct electrode contact, and is greatly enhanced with direct electrode contact. During the flyback mode, the available energy is limited to that stored in the transformer core, and the secondary output power is much less (less than 50V at less than 100 mA in water).

In a dry environment, the primary electroshock stimulus results from the second operational mode when transformer 32 is in a flyback mode. When the skin is dry, the resistance of the skin is relatively high and the higher voltage of the flyback mode is necessary to achieve an adequate electroshock stimulus to the skin.

By voltage limiting device 36 limiting the voltage at second terminal 48 of primary coil 44, the open circuit output voltage across terminals 52 and 54 of secondary coil 50 is also limited. The flyback voltage present across secondary winding 50 is related to the flyback voltage generated across primary winding 44 by the turns ratio of transformer 32. The accuracy of the relationship is affected by the coupling coefficient, which is a function of the design and manufacturing processes of the transformer. If the primary to secondary coupling is adequate, the output voltage amplitude can be limited by clamping the primary flyback voltage at terminal 48 to a threshold voltage or clamping voltage. Clamping the primary voltage limits the output voltage to approximately the product of the turns ratio and the clamping voltage.

The clamping voltage is selected so that when the output of transformer 32 is loaded, i.e., electrodes 16 and 18 are contacting the animal's skin, the primary voltage is below the clamping voltage and no clamping action occurs. The benefits of voltage clamping device 36 are realized, however, when no load is applied to secondary coil 50, i.e., there is no conductive path between electrodes 16 and 18 and the transformer output voltage is at its maximum (up to 10,000 volts).

The benefits include allowing closer spacing between the circuitry and components and the high voltage outputs without risking arcing between these parts. Clamping device 36 also allows the use of smaller, lower cost transformer components. With the output voltage clamped to a lower voltage, the dielectric spacing and potential for internal arcing are substantially reduced. This allows the transformer manufacturer to reduce the size of the transformer and eliminate costly manufacturing techniques to prevent internal arcing. Further, clamping device 36 allows the use of lower breakdown voltage transistors in the transformer driver circuit. This, in turn, allows the use of lower cost and higher gain transistors, thereby minimizing the number of transistor gain stages necessary to switch the high primary currents present in high power flyback transformer designs. Finally, voltage clamping device 36 performs a transformer driver snubber function to prevent damage to the drive transistor circuitry from high peak primary voltages due to the transformer primary winding leakage inductance.

In the embodiment shown, voltage limiting device 36 is shown in the form of a transient voltage suppression diode, also known as a transorb. However, it is to be understood that other types of components can also be used as a voltage limiting device, such as a zener diode, for example. Further, instead of using a dedicated voltage limiting device, it is also possible to use the breakdown voltages of transistors 60 and 62, or the breakdown voltage of a field effect transistor, to clamp the primary voltage at terminal 48. Instead of placing device 36 between terminal 48 and ground, it is also possible to connect clamping device 36 in parallel with primary coil 44.

Upon receiving transmitted signal 24, receiver circuit 22 activates shock device 26 via a line 42 connected to power supply 28, thereby allowing the voltage to be applied across electrodes 16 and 18. The details of how receiver circuit 22 activates shock device 26 are not given in detail herein, as it is also possible for receiver circuit to control pulse generator 56, or to control a switch which may be connected in series with any of transformer terminals 46, 48, 52 or 54.

While this invention has been described as having a preferred design, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A remote receiver unit for use in an animal behavior modification system that applies an electrical shock to an animal, said remote receiver unit comprising:
    an electrical shock device including:
        two electrodes configured for contacting the animal;
        a source of alternating current voltage; and
        an electrical transformer having a primary coil and a secondary coil, said primary coil electrically connected to said source of alternating current voltage, said secondary coil electrically connected to at least one of said two electrodes, said transformer having an output impedance of less than 900 ohms; and
    a receiver circuit electrically connected to said shock device, said receiver circuit being configured for activating said shock device dependent upon a received signal.

2. A remote receiver unit for use in an animal behavior modification system that applies an electrical shock to an animal, said remote receiver unit comprising:

an electrical shock device including:
- two electrodes configured for contacting the animal;
- a source of alternating current voltage; and
- an electrical transformer having a primary coil and a secondary coil, said primary coil electrically connected to said source of alternating current voltage, said secondary coil electrically connected to at least one of said two electrodes, said transformer having an output impedance of less than 800 ohms; and
- a receiver circuit electrically connected to said shock device, said receiver circuit being configured for activating said shock device dependent upon a received signal.

3. A remote receiver unit for use in an animal behavior modification system that applies an electrical shock to an animal, said remote receiver unit comprising:
an electrical shock device including:
- two electrodes configured for contacting the animal;
- a source of alternating current voltage; and
- an electrical transformer having a primary coil and a secondary coil, said primary coil electrically connected to said source of alternating current voltage, said secondary coil electrically connected to at least one of said two electrodes, said transformer having an output impedance of less than 700 ohms; and
- a receiver circuit electrically connected to said shock device, said receiver circuit being configured for activating said shock device dependent upon a received signal.

4. The remote receiver unit of claim 3, wherein said output impedance of said transformer is less than 600 ohms.

5. The remote receiver unit of claim 3, wherein said output impedance of said transformer is less than 500 ohms.

6. The remote receiver unit of claim 3, wherein said output impedance of said transformer is less than 400 ohms.

7. The remote receiver unit of claim 3, wherein said output impedance of said transformer is less than 300 ohms.

8. The remote receiver unit of claim 7, wherein said primary coil of said transformer includes a first terminal and a second terminal, said source of alternating current voltage comprising;
- a direct current voltage battery including a positive terminal electrically connected to said first terminal of said primary coil; and
- a switching device configured for intermittently interconnecting said second terminal of said primary coil with electrical ground.

9. The remote receiver unit of claim 8, wherein said source of alternating current voltage includes a charging capacitor connected in parallel with said battery, said charging capacitor being configured for increasing a current capacity of said source of alternating current voltage.

10. The remote receiver unit of claim 7, wherein said primary coil has a first number of turns, said secondary coil having a second number of turns, a ratio of said second number of turns to said first number of turns being approximately between 30 and 50.

11. The remote receiver unit of claim 7, wherein said secondary coil has a resistance of approximately between 50 and 300 ohms and an inductance of approximately between 50 and 300 millihenries.

12. The remote receiver unit of claim 11, wherein said secondary coil has a resistance of approximately between 100 and 150 ohms and an inductance of approximately between 100 and 220 millihenries.

13. The remote receiver unit of claim 11, wherein said secondary coil includes a wire having a thickness approximately between 35 AWG and 45 AWG.

14. The remote receiver unit of claim 7, further comprising a hermetically sealed box containing said electrical shock device and said receiver circuit.

* * * * *